United States Patent
Wahlström

(10) Patent No.: US 9,422,845 B2
(45) Date of Patent: Aug. 23, 2016

(54) METHOD AND ARRANGEMENT FOR CLEANING A PARTICLE FILTER

(75) Inventor: Gert-Ove Wahlström, Askim (SE)

(73) Assignee: Volvo Lastvagnar AB, Gothenburg (SE)

( * ) Notice: Subject to any disclaimer, the term of this patent is extended or adjusted under 35 U.S.C. 154(b) by 132 days.

(21) Appl. No.: 14/367,975

(22) PCT Filed: Jan. 3, 2012

(86) PCT No.: PCT/EP2012/000011
§ 371 (c)(1),
(2), (4) Date: Jun. 23, 2014

(87) PCT Pub. No.: WO2013/102468
PCT Pub. Date: Jul. 11, 2013

(65) Prior Publication Data
US 2014/0322091 A1    Oct. 30, 2014

(51) Int. Cl.
*F01N 3/023* (2006.01)
*F01N 3/033* (2006.01)
(Continued)

(52) U.S. Cl.
CPC .............. *F01N 3/0232* (2013.01); *B01D 53/94* (2013.01); *F01N 3/0233* (2013.01); *F01N 3/0237* (2013.01); *F01N 3/035* (2013.01);
(Continued)

(58) Field of Classification Search
CPC ........... F01N 1/08; F01N 3/021; F01N 3/023; F01N 3/031; F01M 25/0707; G01M 15/106
USPC .................... 55/385.1, DIG. 30; 60/278, 295; 73/114.76; 422/168, 171
See application file for complete search history.

(56) References Cited

U.S. PATENT DOCUMENTS

| | | | | |
|---|---|---|---|---|
| 3,445,196 A | * | 5/1969 | Thomas | F01N 1/08 422/171 |
| 5,634,952 A | * | 6/1997 | Kasai | F01N 3/023 55/302 |

(Continued)

FOREIGN PATENT DOCUMENTS

| | | |
|---|---|---|
| DE | 102 10 950 A1 | 9/2003 |
| EP | 1 515 011 A1 | 3/2005 |

(Continued)

OTHER PUBLICATIONS

International Search Report (Sep. 21, 2012) for corresponding International App. PCT/EP2012/000011.
(Continued)

*Primary Examiner* — Duane Smith
*Assistant Examiner* — Minh-Chau Pham
(74) *Attorney, Agent, or Firm* — WRB-IP LLP

(57) ABSTRACT

A method and an arrangement for cleaning a particulate filter in a vehicle provided with an internal combustion engine is provided. The particulate filter is mounted in an operative position inside an exhaust muffler under normal operation of the engine. The method involves performing a cleaning process including disassembling and removing the particulate filter from a first end of the muffler; reversing and reassembling the particulate filter a cleaning position at the first end of the muffler; starting and operating the engine by controlling the engine speed according to a predefined cycle until a predetermined condition is fulfilled; and stopping the engine and returning the particulate filter to its operative position inside the exhaust muffler.

21 Claims, 7 Drawing Sheets

(51) Int. Cl.
  *F01N 3/035* (2006.01)
  *B01D 53/94* (2006.01)

(52) U.S. Cl.
  CPC ......... *F01N 3/0335* (2013.01); *B01D 2255/00* (2013.01); *B01D 2258/012* (2013.01); *F01N 2470/22* (2013.01)

(56) References Cited

U.S. PATENT DOCUMENTS

| | | | |
|---|---|---|---|
| 6,824,743 B1 * | 11/2004 | Pawson | F01N 3/021 422/168 |
| 7,047,731 B2 | 5/2006 | Foster et al. | |
| 2006/0191255 A1 * | 8/2006 | Olofsson | F01N 3/031 60/295 |
| 2007/0256410 A1 | 11/2007 | Cook | |
| 2010/0242451 A1 | 9/2010 | Werni et al. | |
| 2011/0023471 A1 | 2/2011 | Werni et al. | |
| 2012/0144806 A1 * | 6/2012 | Hamamatsu | F02M 25/0707 60/278 |
| 2015/0369700 A1 * | 12/2015 | Varney | G01M 15/106 73/114.76 |

FOREIGN PATENT DOCUMENTS

| | | |
|---|---|---|
| GB | 2387339 A | 10/2003 |
| JP | 2000110547 | 4/2000 |
| JP | 2002227632 | 8/2002 |
| JP | 2003155911 | 5/2003 |
| JP | 2008088902 | 4/2008 |
| JP | 2011131181 | 7/2011 |
| WO | 2004/079169 A1 | 9/2004 |

OTHER PUBLICATIONS

Japanese Official Action (translation) (Aug. 31, 2015) for corresponding Japanese App. 2014-550640.

* cited by examiner

METHOD AND ARRANGEMENT FOR CLEANING A PARTICLE FILTER

BACKGROUND AND SUMMARY

This invention relates to a method and an arrangement for cleaning a vehicle particulate and more particularly to a method and apparatus for in-situ cleaning of a diesel particulate filter using an exhaust stream.

A diesel particulate filter (DPF) removes organic and inorganic particulate matter (PM) from the exhaust gas stream of an engine. The organic particulate is a complex blend of carbon, hydrogen and oxygen, and is a result of incomplete combustion of the diesel fuel in the cylinder. The inorganic portion of the PM has its source in the additives in the lubrication oil or fuel, and material eroded from the engine surfaces. A large part of these inorganic substances consist of metal oxides of sulphur, for example calcium sulphate. This means they will permanently clog the particulate filters in the long run. Under optimal circumstances, the organic PM will fully combust during filter regeneration and thus leave the filter as gaseous $CO_2$ and $H_2O$. The inorganic component, on the other hand, can not be oxidized inside the filter and converted to gaseous components. Instead it is trapped in the filter as various oxides, commonly termed "ash". To maintain acceptable performance, the ash must be periodically removed from the filter to prevent it from clogging.

Some installations of diesel particulate filters (DPF) are made on engines which have operating temperatures too low to properly regenerate the filter, for instance, by oxidizing the organic PM. In these cases, the filter can become clogged with PM and potentially reduces the performance of the engine. In addition, a filter with a high soot load has a higher chance of permanent damage through uncontrolled regeneration than one with low soot load. In these cases of insufficiently high operating temperature, regular removal of the soot may be required.

Prior art approaches to filter cleaning, as discussed below, are often complex or comprise moving parts, while others are ineffective at removing tightly bound particulate matter. Other processes can lead to high PM emissions during the cleaning process.

The following examples illustrate a number of prior approaches (e.g., devices and methods) and their disadvantages.

I. Cleaning the DPF when Removed from the Engine

A simple way to clean a filter is with a compressed air hose. The hose is directed into the exit face of the filter, thus blowing the soot out of the wall in the reverse direction to which it was initially deposited (i.e., backwashing or back flushing). This method is imprecise, potentially dangerous (compressed air hazards), requires the full attention of an operator, and if improperly performed can lead to emission of PM from the filter end as well as a poorly cleaned filter.

The dirty filter can be heated in at oven to a high temperature in order to effectively remove the carbon-based particles. This requires a significant energy input and does not remove the inorganic ash. After a heating cycle, the cool down period is significant, and the ash must be removed through vacuuming or washing the filter.

Many systems for cleaning industrial devices utilize a combination of liquid flow and ultrasound, which may be effective, but can be comparatively expensive. In addition, the cleaning liquid can damage the catalytic coating or the matting material which secures the catalyst within its metal housing.

Other methods have described cleaning systems which involve backwashing with a suitable "cleaning fluid" until the filter is clean. However, many catalysts and their matting material are sensitive to large amounts of water or solvents. Solvents have the additional disadvantage of requiring disposal. In addition, the flow of cleaning fluid might not be controlled locally (i.e., a single fluid stream flows over the unit), so that some sections of the filter might not be cleaned as well as others.

A problem with such solution is that all garages or service facilities may not have suitable equipment for filter cleaning. In this case the vehicle may need to be fitted with a replacement filter to remain in operation while the filter is being cleaned. This requires a store of relatively expensive filters to be maintained by the garage or haulage company, in order to have access to replacement filters at all times.

II. Cleaning the DPF while Mounted on the Engine

Methods for collecting particulate using several particulate filters with valves to control the flow path are described in a number of patent documents.

For instance, U.S. Pat. No. 5,930,994 shows a combination of valve settings can start the back-flush of one of the filters i.e., the direction of gas flow is reversed and flows to push the soot out of the filter. The reversed air flow can be heated to allow soot to be burned off as the air passes the DPF.

U.S. Pat. No. 5,725,618 discloses a method which 'backwashes' a DPF to remove the particulate and ash collected in the filter. The backwashing occurs while the device is on the vehicle, and an impact air valve is used to provide a pressure wave to dislodge the particulate matter. In order to allow the entire DPF to be cleaned, the filter unit is rotated in order to expose a predetermined sector of the filter unit to the air stream supplied by the impact air valve.

The above "back-flush" methods have the disadvantage that the ash from the lubricating oil never leaves the filter system, as back-flushed ash from one element flows into another element, and manual cleaning will still be required. Also the dislodged material must somehow be removed from the exhaust conduit receiving said material.

III. Rotating Arms

A further method of cleaning a DPF involves a device using a rotating electrical heating element. A portion of the exhaust gas bleeds through a rotating arm and flows over the heating element. The combination of low flow rate and high temperature improves the chance of regeneration.

U.S. Pat. No. 5,116,395 discloses a dust collector with on-board programmable cleaning control. A rotating arm with a plurality of nozzles mounted upon it provides the back-flushing flow, thus causing the particulate to be removed from the bag surface and settle into a collection chamber. The control system operates the min and nozzles to produce jets of cleaning fluid above the various bag units. The arm also contains a sensor for determining the dirtiness of each filter element (a pitot tube is suggested). The system described in the patent has several design elements which make it unsuitable for use in diesel particulate filter applications. First, DPFs are much smaller than dust collectors, and the nozzle designs in the above dust collector a specialized for large filters. A typical DPF is between 15 cm and 32 cm in diameter. The dust collector shown in the patent appears have a relatively large diameter. Second, DPFs can have many thousand cells, and thus focusing air on each individual cell is impractical. Other similar designs for dust collectors have the same shortcomings.

It is desirable to provide an improved method and arrangement for cleaning a vehicle particle filter using an existing exhaust stream in order to overcome the above problems.

In the subsequent text, terms such as "longitudinal" and "transverse" are used to denote directions relative to the main direction of movement of the vehicle. Similarly, terms such as "front" and "rear" are used to define the relative position eta component in relation to said direction of movement.

The invention relates, according to an aspect of the present invention, to a method for cleaning a particulate filter in a vehicle provided with an internal combustion engine, which particulate filter is mounted in an operative position inside an exhaust muffler under normal operation of said engine. The method for performing a cleaning process involves the steps of:

- disassembling and removing the particulate filter from a first end of the muffler;
- reversing reassembling the particulate filter in a cleaning position at said first end of the muffler;
- starting and operating the engine by controlling the engine speed according to a predefined cycle until a predetermined condition is fulfilled;
- stopping the engine and returning the particulate filter to its operative position inside the exhaust muffler.

The engine speed is controlled so that the particulate filter is cleaned by a pulsed exhaust flow from the engine. The engine speed is varied between an upper and a lower limit for a set number times during at least one cycle and measuring a value representing said predetermined condition at the end of said at least one cycle. According to a non-limiting example, the engine speed can be varied from a lower limit selected within the range 700 rpm to 1100 rpm, to an upper limit selected within the range 1500 rpm to 1800 rpm. During each cycle, the engine speed is varied between the upper and lower limit a set number of times over a predetermined period of time. According to a non-limiting example, the number can be selected between 60 and 120 and the period of time can be selected between 60 s and 240 s. The total time taken to complete a cleaning process can be in the range of 10-20 minutes. The above values are merely examples as the selection varies depending on the type and size of engine, the size and the degree of clogging of the particle filter and the type of equipment available for performing the cleaning operation, as will be described below.

Prior to the first cycle the engine speed is increased to a stabilized value during a time period sufficient to allow the exhaust temperature in the muffler to stabilize. The stabilized value for engine speed is preferably at least equal to said upper limit, but can be selected higher or lower than said upper limit. A value representing said predetermined condition is then measured, such as the back pressure or the pressure drop across the muffler or the filter unit, and a first cycle is initiated. The first measurement can be compared to a stored value from a previous cleaning process to determine the degree of clogging. If the filter was replaced during previous service, then a reference value for a clean filter can be used.

At the end of said at least one cycle the engine speed is increased to a limit above said upper limit during a set time period and at least one value representing said predetermined condition is measured. Depending on the type value to be measured, such as the pressure at a suitable location in the exhaust conduit, it can be an advantage or a requirement to allow the exhaust temperature to stabilise before taking a reading, in order to get a correct measurement. Said cycle is repeated until said predetermined condition is fulfilled, or until a maximum number of cycles have been performed. The value representing said predetermined condition can be the exhaust back pressure or the pressure drop across the particulate filter. In most modern engines, exhaust pressure sensors are provided for controlling various parameters in the engine during normal operation. If required, one or more pressure sensors can be provided in the muffler or the particular filter, if standard sensors are not available.

According to one example, the method can be performed by controlling the engine speed during the cleaning process using an electronic control unit. The electronic control unit can be an engine control unit or an external electronic control unit. The electronic control unit can be pre-programmed, whereby the software required for running a cleaning programme is stored on a non-volatile memory or a hard drive in the electronic control unit. Alternatively, the necessary software can be stored on a portable, hand-held unit or on a non-volatile storage unit such as a USB stick or a flash memory that can be connected to the electronic control unit or the engine control unit. In this context, non-volatile data storage is defined to include electrically addressed systems, such as read-only memory (ROM), and mechanically addressed systems, such as hard disks, optical discs, magnetic tapes, holographic memories, etc.

Measurements of said value from a previous cleaning process can be stored in said electronic control unit and be used to set the predetermined condition. In this way, it is possible to compare current readings for said value with values from the previous times the filter was cleaned, or from the time the filler was last replaced. In this way the condition and current state of the particulate filter can be monitored and an expected lifetime can be calculated.

It is also possible to store measurements of at least one value relating to the operation of the engine since the previous cleaning process in said electronic control unit to set the predetermined condition. According to one example, the measured pressure drop across the particulate filter at the end of the previous cleaning process can be set as target for the predetermined condition. Additional factors that can be taken into account when setting the predetermined condition can be the driven distance, engine running time or the fuel and/or oil consumption since the previous cleaning process.

If it is determined that an particulate cleaning process is required under conditions where no electronic control means is available for performing said process, a simplified, emergency cleaning process can be performed. According to this example the engine speed is varied between an upper and a lower limit manually, while measuring the time from the start of the first cycle. The pulsed flow is achieved by pushing the throttle at a predetermined frequency, while monitoring the tachometer, or rpm gauge, to check the upper and lower rpm limits, respectively. This operation can be performed for a predetermined number of cycles or for a period of time estimated to result in a sufficient cleaning of the filter. The particulate filter can then be reversed back into its operative position and the vehicle is again operational.

The invention also relates to an arrangement comprising a vehicle muffler and a particulate filter mounted in an operative position inside said exhaust muffler under normal operation of an engine connected to said muffler. The particulate filter has a first contact surface facing a first end of the muffler, which first contact surface is in sealing contact with a cooperating surface at a first end of the muffler when the particulate filter is in its operative position. Also, the particulate filter has a second contact surface, which second contact surface is in sealing contact with the cooperating surface at the first end of the muffler when the particulate filter is in a filter cleaning position.

The particulate filter is located inside the muffler in its operational position; and that the particulate filter is reversed and located at least partially outside said first end of the muffler in the filter cleaning position.

The first and second contact surfaces are arranged on opposite sides of a flange around the outer periphery at one end of the particulate filter. Each of the first and second contact surfaces comprises an annular contact surface that is identical and mirrored relative to a plane through the flange at right angles to the central axis of the particulate filter.

An ash collecting device is attached to the end of the particulate filter remote from the muffler, when the particulate filter is in a filter cleaning position 18. The ash collecting device is preferably attached to the annular sealing surface of the particulate filter remote from the muffler, when the particulate filter is in a filter cleaning position. Examples of such ash collecting devices can range from a filter bag attached to the end of the particulate filter, to a hose connector provided with a hose connected to a suction means for assisting the removal of ash. Extracted ash can be removed from the exhaust gas by means of a suitable gas treating device, such as a water scrubber, a cyclone cleaner, an electrostatic filter or a similar device.

The invention also relates to a computer program comprising program code means for performing all the steps of the method described above when said program is run on a computer. The invention further relates to a computer program product comprising program code means stored on a computer readable medium for performing all steps of the method described above when said program product is run on a computer. Finally, the invention relates to a computer system for implementing a method of cleaning a particulate filter in a vehicle comprising a memory for storing program code means and a processor operable to run said program code means for performing all the steps of the method described above.

BRIEF DESCRIPTION OF DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein.

DETAILED DESCRIPTION

Figure 1:
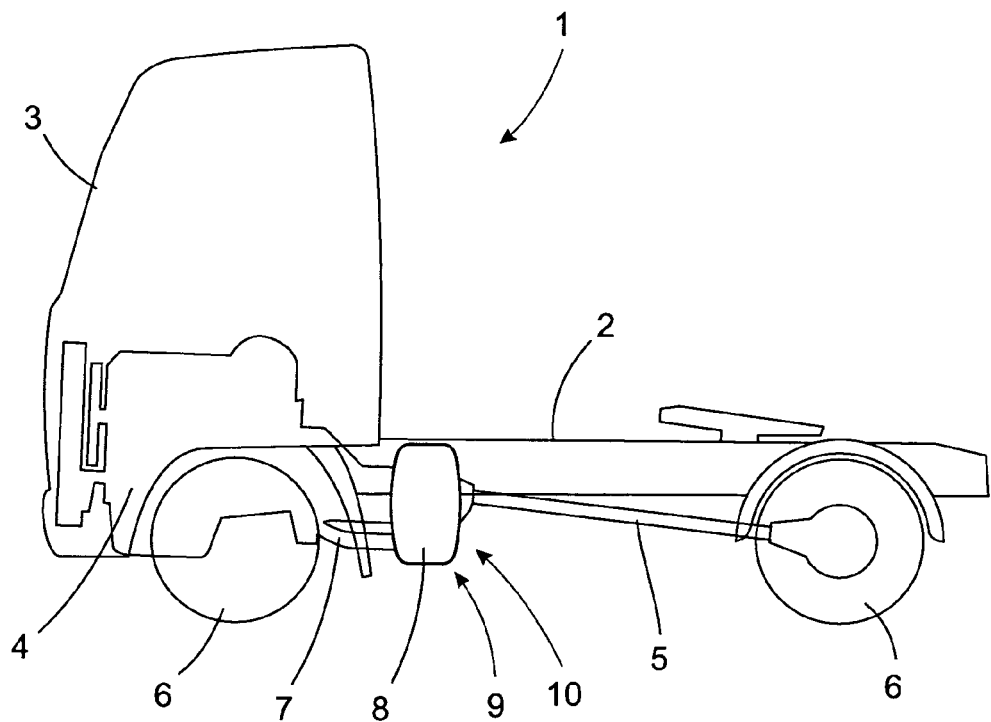
FIG. 1 shows a vehicle provided with an apparatus for cleaning a particulate filter according to the invention.
Figure 2:
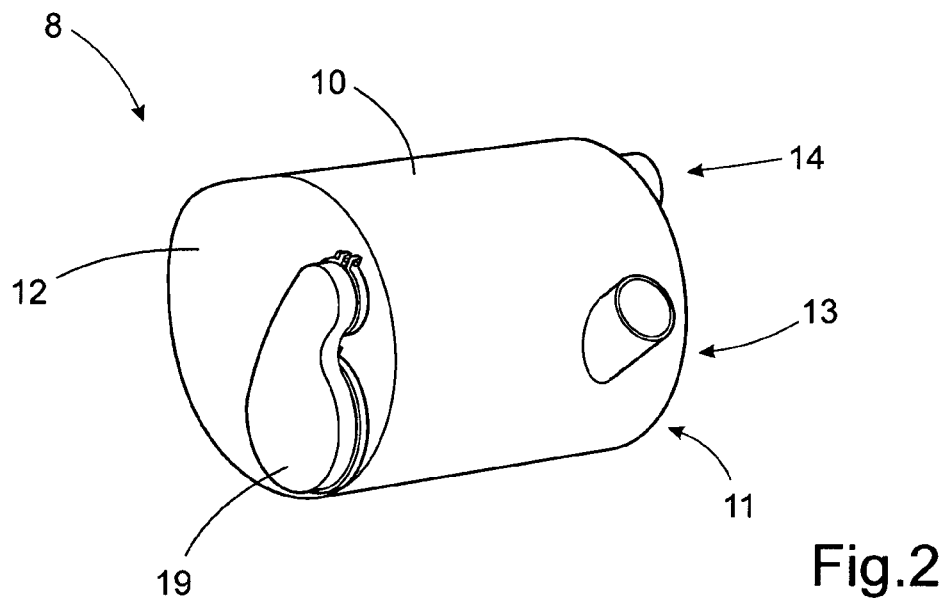
FIG. 2 shows a muffler with a particulate filter in its operative position.

FIG. 1 shows a commercial vehicle 1 in the form of a tractor unit. The commercial vehicle 1 comprises a chassis 2 and a driver's cab 3 mounted on the chassis. Underneath the driver's cab 3 is an internal combustion engine 4, which acts on the drive wheels 6 of the commercial vehicle 1 by way of a drive train 5 comprising a clutch and a manual transmission or an automatic transmission. The internal combustion engine 4 comprises an exhaust gas system 7 with a first muffler 8 provided with an exhaust after-treatment system (EATS) and a second muffler 9 (see FIG. 10*a*) connected to a tailpipe (not shown) which expels the exhaust gases to the atmosphere. The second muffler and the tailpipe can be located to one side of the chassis, as in this example, or extend upwards behind the driver's cab. The location of the latter components is not relevant to the invention and will not be described in further detail. The invention may also be used without these components.

Figure 6A:
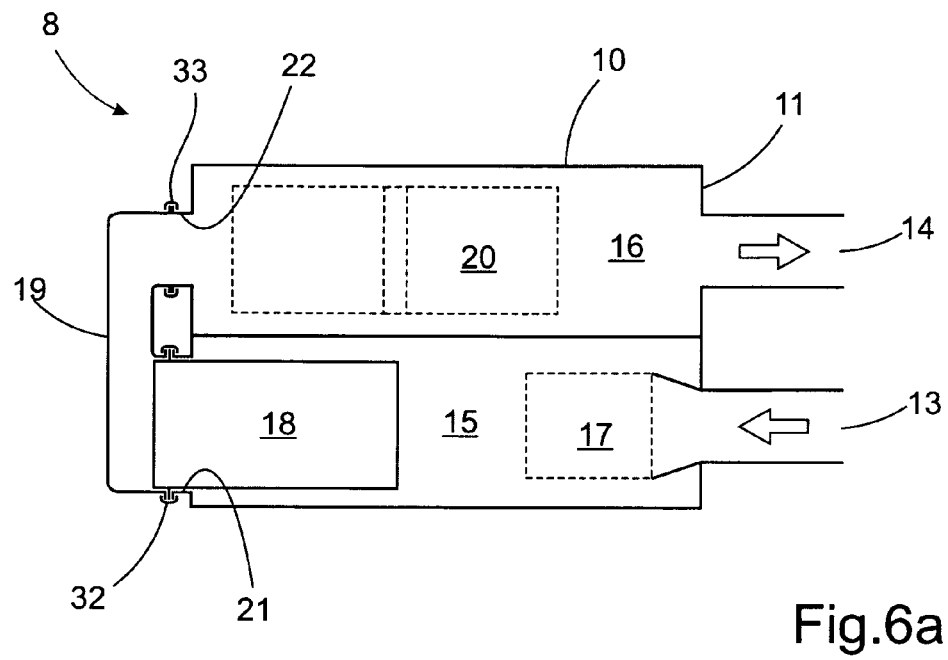
FIG. 6*a* shows a schematic cross-section through the muffler in FIG. 2.

The first muffler 8, which is installed in the commercial vehicle 1 according to FIG. 1 adjacent to the internal combustion engine 4 and which is attached to the frame of the chassis 2, can be constructed as shown in FIGS. 1 to 5. This muffler 8 is designated in the form of a drum and comprises a front-end wall 11 and a rear-end wall 12; and a hollow at least partially cylindrical circumferential outside wall 10, which connects both end walls 11, 12. An intake conduit 13 and an exhaust conduit 14, for normal operation, are provided in the front end wall 11. Within the scope of the invention, one or both of the intake and exhaust conduits may be located on the outside wall 10. The muffler also comprises an internal separating wall extending throughout the inner space of the muffler, dividing the muffler 8 into two separate internal volumes 15, 16. This can be seen in FIG. 6*a*, which shows a cross-section through the muffler 8 with the particulate filter 18 in its operational position. With reference to FIG. 6*a*, a first volume 15 contains a first exhaust purifying means in the form of an oxidizing catalyst 17 located downstream of the intake conduit 3 and upstream of a particulate filter 18, in this case a substantially cylindrical diesel particulate filter (DPF). A second volume 16 contains an exhaust purifying means in the form of a selective catalytic reactor 20, or SCR catalyst, located upstream of the exhaust conduit 14. The first and second volumes 15, 16 are connected by a substantially U-shaped conduit 19, which extends from a first opening 21 to a second opening 22 in the rear end wall 12.

Figure 6B:
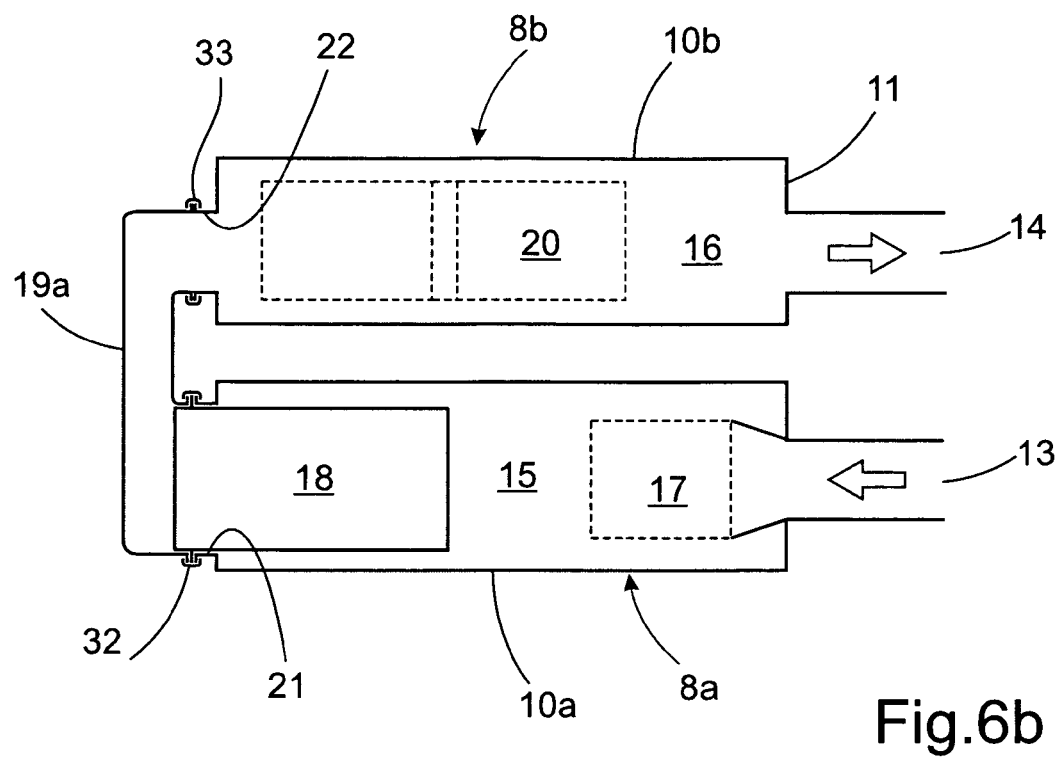
FIG. 6*b* shows a schematic cross-section through an alternative muffler.

FIG. 6*b* shows a schematic cross-section through an alternative muffler. This alternative muffler comprises substantially the same component parts as the muffler in FIG. 6*a*, with the difference that the muffler comprises a first muffler unit 8*a* and a second muffler unit 8*b*. In FIG. 6*b*, the same reference numbers are used for components identical to those in FIG. 6*a*. The first muffler unit 8*a* contains the same components as the first volume 15 of the muffler in FIG. 6*a*, while the second muffler unit 8*b* contains the same components as the second volume 16 of the muffler in FIG. 6*a*. The first and second volumes 15, 16 are enclosed by a first and a second outer wall 10a, 10b, respectively. This arrangement allows said first and second muffler units 8a, 8b to be mounted remote from each other, connected by a conduit 19a. Hence, the first muffler unit 8a contains the particulate filter 18, which filter is accessible by removal of the conduit 19a.

Figure 3:
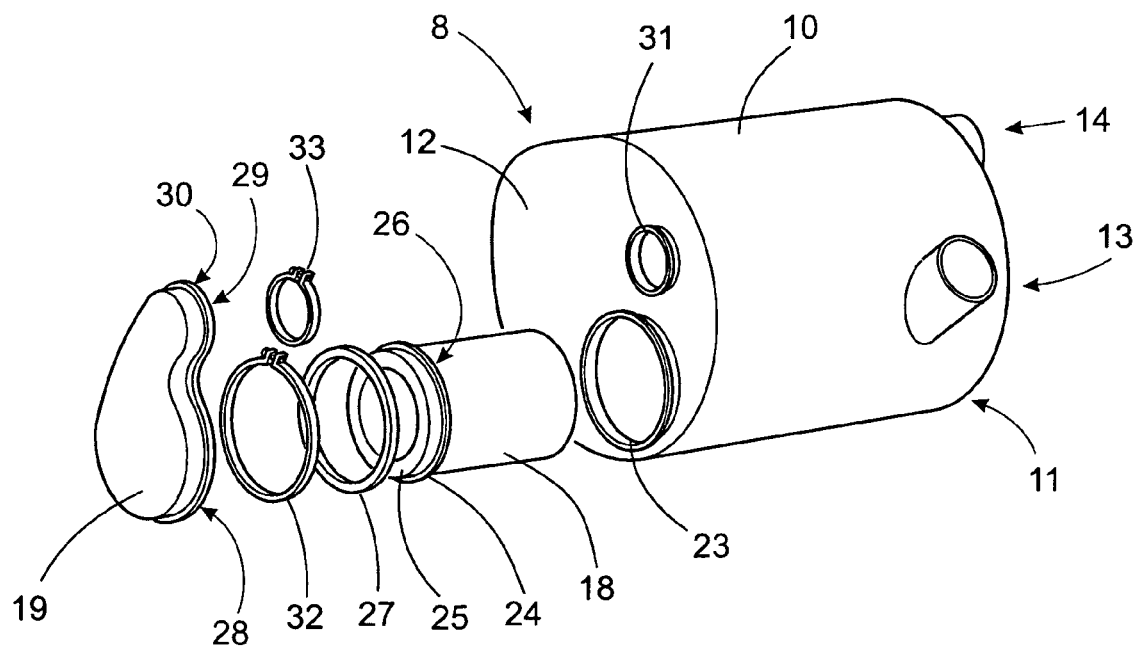
FIG. 3 shows an exploded view of a muffler with a particulate filter.

FIG. 3 shows an exploded view of a portion of the muffler 8 with the particulate filter 18 and the U-shaped conduit 19 removed. As indicated in FIG. 3, the first opening in the rear end wall 12 comprises a tubular outlet with a first flange 23. The first flange 23 is arranged to cooperate with and seal against a circumferential flange 24 located adjacent the rear, first end 25 of the particulate filter 18. A first ring shaped seal or O-ring 26 is placed between the flanges 23, 24 to ensure that the connection is gas tight during normal operation. A second ring shaped seal or O-ring 27 is placed between the circumferential flange 24 and a first flange 28 at the inlet end of the U-shaped conduit 19 for the same purpose. Similarly, a third ring shaped seal or O-ring 29 is placed between a second flange 30 at the outlet end of the U-shaped conduit 19 and a second flange 31 at the second opening in the rear end wall 12. First and second circular clamps 32, 33 are arranged to hold the particular filter 18 in place, while clamping the first and second flanges 28, 30 on the U-shaped conduit 19 onto the first and second flanges 23, 31, respectively, on the rear end wall 12. The first and second circular clamps 32, 33 have a substantially U-shaped cross-section, allowing then to be placed over the respective flanges and tightened to seal the connection between the first and second volumes inside the muffler 8. The first clamp 32 is also used for clamping the particulate filter 18 to the first flange 43 of the rear end wall 12 when the filter is in its reversed position. This type of clamps is known in the art and will not be described in further detail. The above-mentioned seals can form integral parts of the sealing surfaces and/or comprise separate, removable seals such as O-rings.

The circumferential flange 24 is shaped so that its outer contact surface will seal against both the first flange 28 of the U-shaped conduit 19 and against the first flange 23 on the rear end wall 12. This allows the particular filter 18 to be removed from its operative position in the muffler 8, as indicated in FIG. 3, to be reversed and then mounted onto the first flange 23 on the rear end wall 12 in a filter cleaning position, as indicated in FIG. 4.

Figure 4:
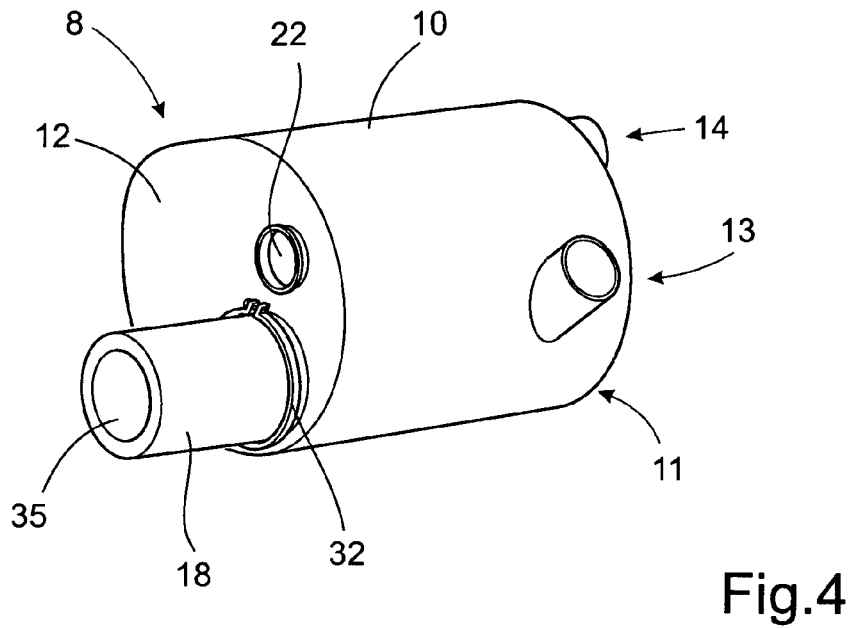
FIG. 4 shows a muffler with a particulate filter in its cleaning position.
Figure 5:
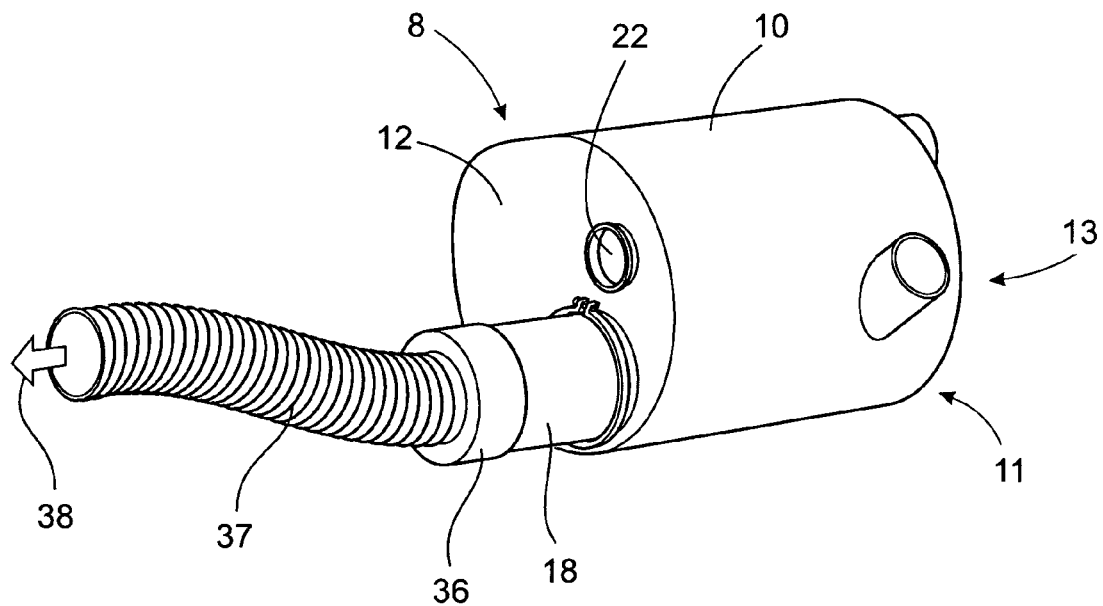
FIG. 5 shows a muffler with a particulate filter connected to a suction means for extracting ash.
Figure 7:
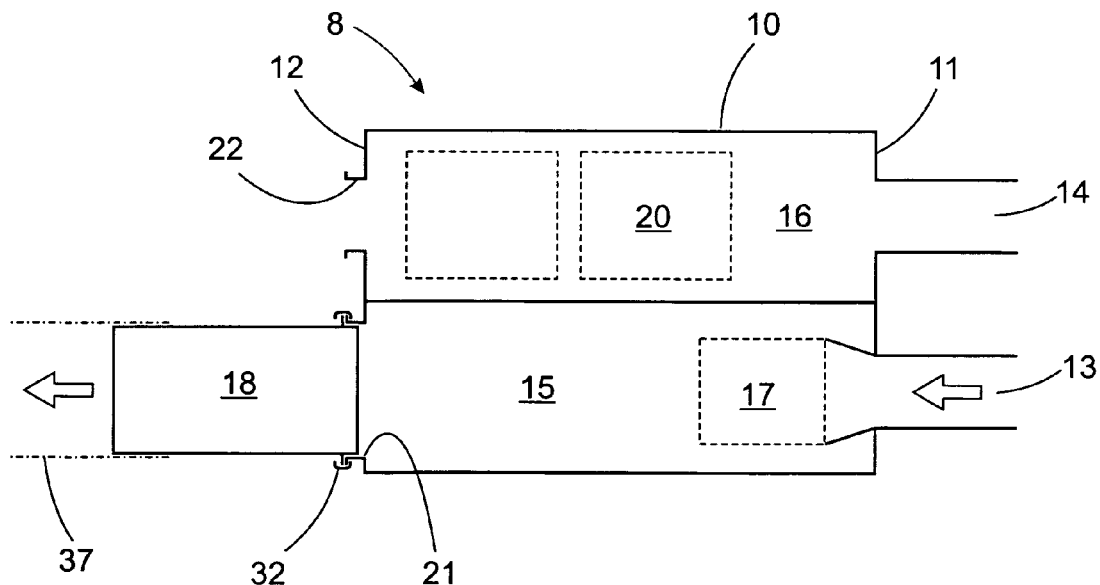
FIG. 7 shows a schematic cross-section through the muffler in FIG. 4.

FIG. 4 shows the muffler 8 and the particulate filter 18 in position for performing a cleaning operation for the filter, wherein the end 35 of the particular filter 18 normally facing the intake conduit 13 on the front end wall 11 is open to the atmosphere. With the U-shaped conduit 19 removed and the particulate filter 18 mounted onto the rear end wall 12, all exhaust gas will pass through the first volume 15 as the second volume 16 is bypassed. This can be seen in FIG. 7, which shows a cross-section through the muffler 8 with the particulate filter 18 in its cleaning position. With reference to FIG. 7, it can be seen how the exhaust gas is supplied from the intake conduit 13, flows through the first volume 15 and the particulate filter 18, and passed out through the collecting hose 37.

The arrangement of the particular filter 18 as described in connection with FIGS. 6a and 8 also applies to the alternative muffler in FIG. 6b.

During a cleaning operation, the particular matter or ash dislodged from the particulate filter is removed for safe disposal. In the example shown in FIG. 5, this is achieved by fitting a hose connector 36 over the open end 35 of the particulate filter 18. The hose connector 36 is provided with a hose 37 connected to a suction means (not shown) for assisting the removal of ash, as indicated by arrow 38. During a cleaning operation, the internal combustion engine is started, whereby exhaust is supplied to the intake conduit 13, passes through the particulate filter 18 to dislodge ash, and is removed through the hose 37.

According to the invention, the particulate filter is mounted in an operative position inside an exhaust muffler under normal operation of said engine. When it is determined that the particular filter is becoming clogged and a cleaning of the filter is required, the following steps are performed:

disassembling and removing the particulate filter 18 from the rear end wall 12 of the muffler 8;

reversing and reassembling the particulate filter 18 in a cleaning position at the rear end wall 12 of the muffler 8;

starting and operating the internal combustion engine 4 by controlling the engine speed according to a predefined cycle until a predetermined condition is fulfilled;

stopping the internal combustion engine 4 and returning the particulate filter 18 to its operative position inside the exhaust muffler 8.

Figure 8:
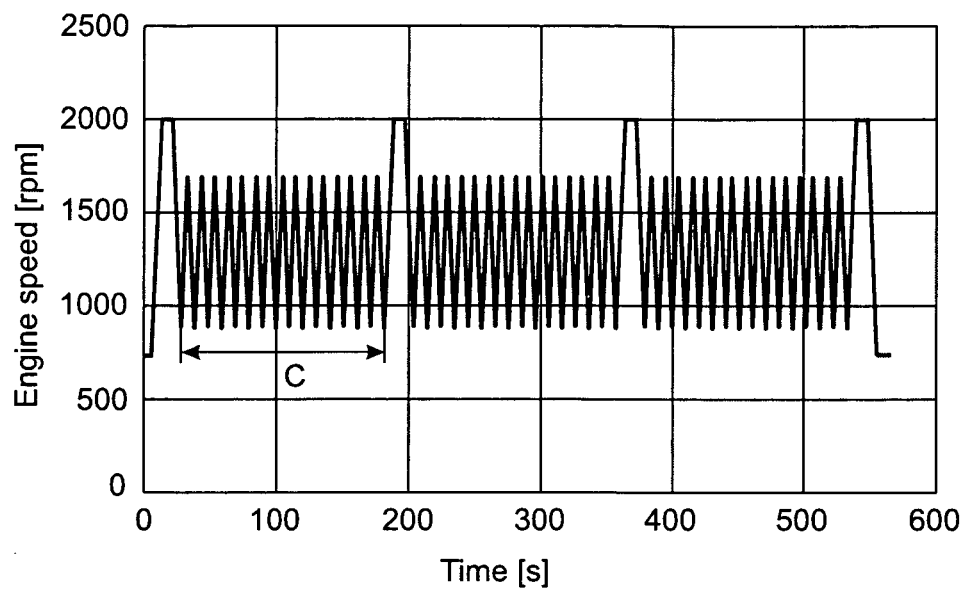
FIG. 8 shows a schematic diagram indicating engine speed variation over time during cleaning of the particulate filter.

FIG. 8 indicated how the engine speed is controlled so that the particulate filter is cleaned by a pulsed exhaust flow from the engine. The engine speed is varied between an upper and a lower limit for a set number times during at least one cycle C and measuring a value representing said predetermined condition at the end of said at least one cycle C. According to the example in FIG. 8, the engine speed is being varied from a lower limit of approximately 900 rpm, to an upper limit of approximately 1700 rpm. During each cycle, the engine speed is varied between the upper and lower limit a set number of times, in this case 15 times, over a predetermined period of time, in this case approximately 180 s. The total time taken to complete a cleaning process can be in the range of 10-15 minutes, depending on the degree of clogging of the filter.

Prior to the first cycle the engine speed is increased to a limit above said upper limit, in this case 2000 rpm, during a time period sufficient to allow the exhaust temperature in the muffler to stabilize. A value representing said predetermined condition is then measured, in this case the pressure drop across the muffler, and the first cycle is initiated. The first measurement is compared to a stored value from a previous cleaning process to determine the degree of clogging. If the filter was replaced during a previous service, then a reference value for a clean filter can be used.

At the end of each cycle the engine speed is increased to said limit above said upper limit during a set time period and said value representing said predetermined condition is measured again. As indicated above, the exhaust temperature is allowed to stabilise before taking a reading, in order to get a correct measurement. Said cycle is repeated until said predetermined condition is fulfilled or until a maximum number of cycles have been performed without reaching the predetermined condition. The value of the pressure drop across the particulate filter to be achieved can be based on empirical testing and be read from a table, or be based on stored values of the pressure drop from the previous cleaning operation. FIG. 8 shows a series of three consecutive cycles as described above.

Figure 9:
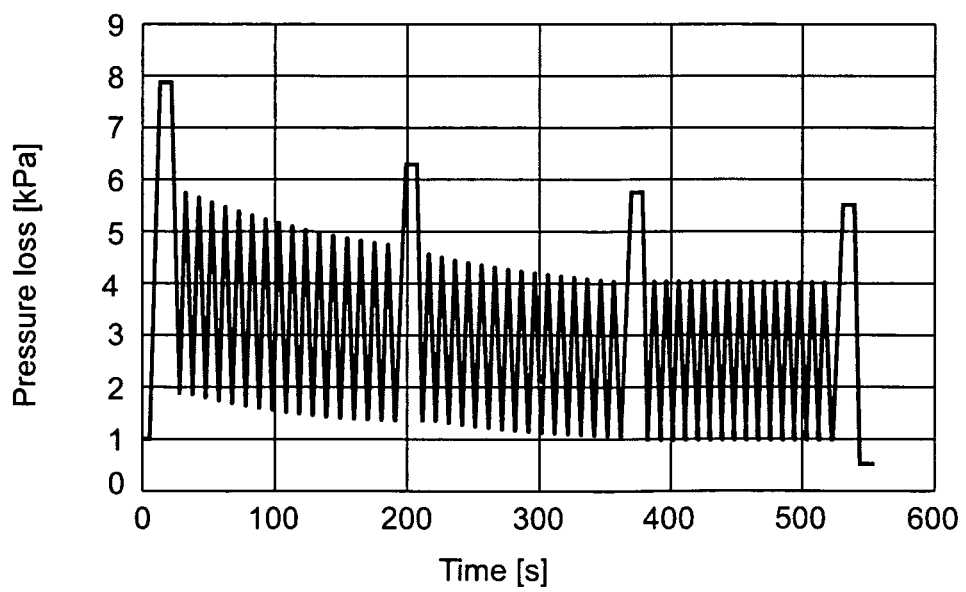
FIG. 9 shows a schematic diagram indicating pressure drop across the muffler over time during cleaning of the particulate filter.

FIG. 9 shows a schematic diagram indicating the pressure drop across the muffler during the cleaning process. From this diagram it can be seen how the measured values for the pressure drop, indicated by the spikes of the schematic curve, gradually drops after each cycle. By using this curve, the cycles can be repeated until a predetermined value for the pressure drop has been achieved, until two consecutive measurements show no or nearly no change, or until a preset elapsed time causes the process to time out and stop.

Figures 10A, 10B:
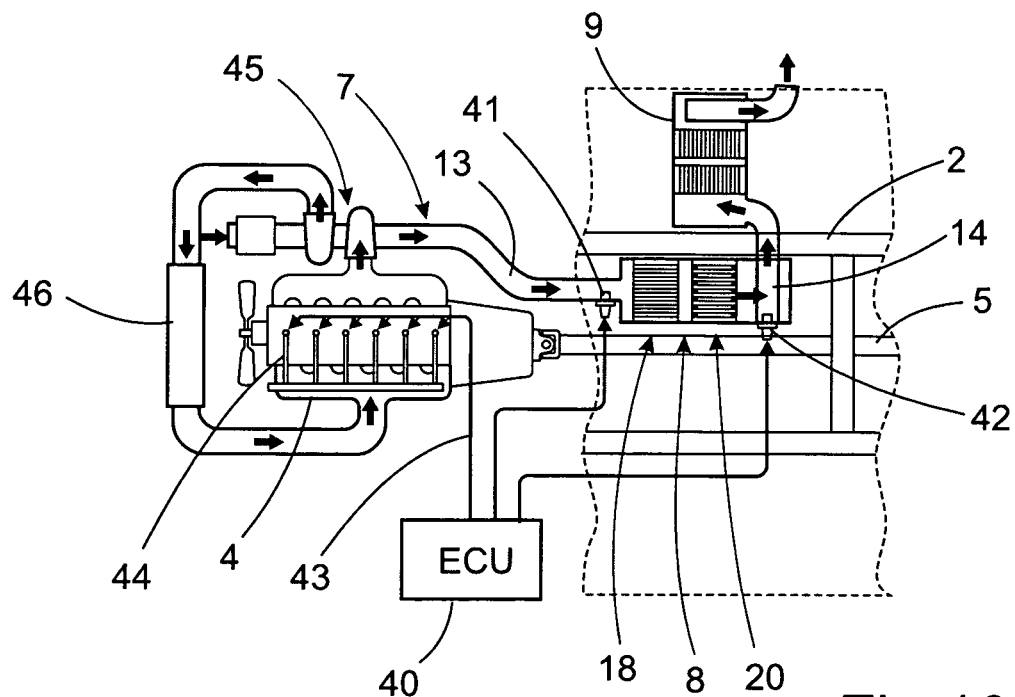
FIG. 10*a* shows a schematic plan view of the internal combustion engine and the exhaust system of the vehicle in FIG. 1.
FIG. 10*b* shows a schematic plan view of the internal combustion engine and an alternative exhaust system.

FIG. 10a shows a schematic layout for the internal combustion engine 4 and the exhaust system in FIG. 1 and uses the same reference numbers. As indicated above, the exhaust system comprises a first muffler 8 provided with an exhaust after-treatment system (EATS) and a second muffler 9 connected to a tailpipe which expels the exhaust gases to the atmosphere. The schematically indicated first muffler 8 corresponds to the muffler shown in FIG. 6a. An electronic control unit 40 is connected to first and second exhaust pressure sensors 41, 42, upstream and downstream of the muffler 8, respectively. The electronic control unit 40 is a conventional engine control unit connected to the internal combustion engine 4 via a control line 43. In the example shown, the internal combustion engine is a conventional diesel engine provided with controllable fuel injectors 44, a turbocharger 45 and an intercooler 46 for intake air. The engine itself will not be described in further detail here. The electronic control unit 40 comprises a microprocessor and a non-volatile storage unit for storing and retrieving measured data. This exhaust arrangement allows said first and second mufflers 8, 9 to be mounted remote from each other, which can be an advantage for packaging purposes where the available space is limited.

FIG. 10b shows a schematic plan view of the internal combustion engine and an alternative exhaust system. This alternative exhaust system comprises substantially the same component parts as the exhaust system in FIG. 10a. The main difference between these exhaust systems is that the muffler in FIG. 10b comprises a single muffler arrangement with a combined first and second muffler 8a, 9a. This single muffler arrangement contains both the first and second mufflers 8, 9 as indicated in FIG. 10a. The schematically indicated first muffler 8a corresponds to the muffler shown in FIG. 6a. This arrangement allows said first and second mufflers to be mounted together as a single muffler unit 8a, 9a, which can be an advantage from the point of view of access during servicing of the exhaust system.

According to one example, the method can be performed by controlling the engine speed during the cleaning process using an electronic control unit. The electronic control unit can be an engine control unit, as indicated in FIGS. 10a and 10b, or an external electronic control unit that is connected to the engine control unit. The electronic control unit can be pre-programmed, whereby the software required for running a cleaning programme is stored on a non-volatile memory or a hard drive in the electronic control unit. Alternatively, the necessary software can be stored on a portable, hand-held unit or on a non-volatile storage unit such as a USB stick or a flash memory that can be integrated in or connected to the electronic control unit or the engine control unit. In this context, non-volatile data storage is defined to include electrically addressed systems, such as read-only memory (ROM), and mechanically addressed systems, such as hard disks, optical discs, magnetic tapes, holographic memories, etc.

Measurements of said value from a previous cleaning process can be stored on a memory in said electronic control unit and be used to set the predetermined condition. In this way, it is possible to compare current readings for said value with values from the previous times the filter was cleaned, or from the time the filter was last replaced. In this way the condition and current state of the particulate filter can be monitored and an expected lifetime can be calculated. It is also possible to store measurements of at least one value relating to the operation of the engine since the previous cleaning process in said electronic control unit to set the predetermined condition. According to one example, the measured pressure drop across the particulate filter at the end of the previous cleaning process can be set as target for the predetermined condition. Additional factors that can be taken into account when setting the predetermined condition can be the driven distance, engine running time or the fuel and/or oil consumption since the previous cleaning process.

As indicated above, the described method is particularly suited to be controlled by a computer. Hence, the present invention also relates to a computer program, computer program product and a storage medium for a computer all to be used with a computer for executing said method.

Figure 11:
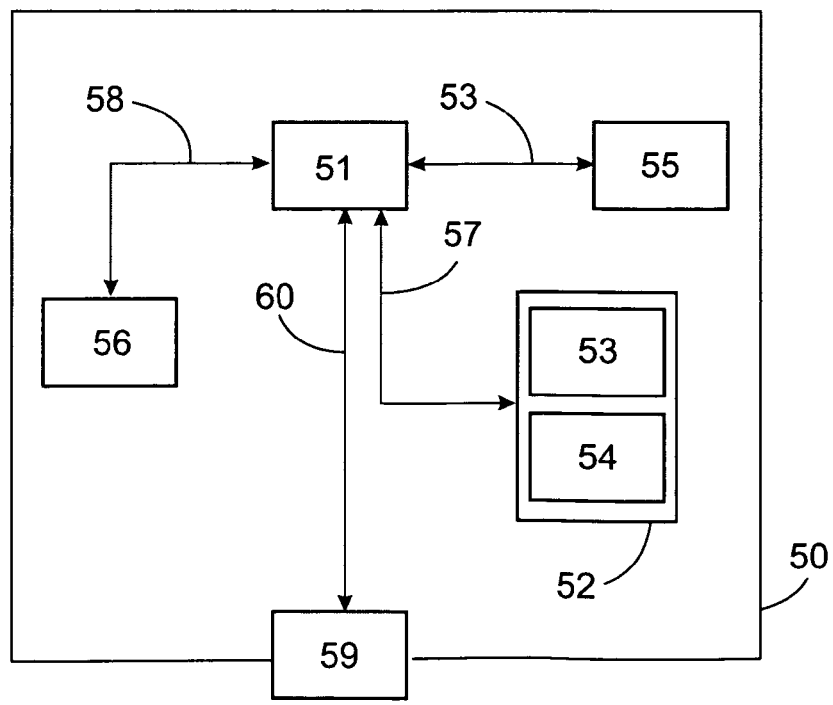
FIG. 11 shows the invention applied on a computer arrangement.

FIG. 11 shows the invention applied on such a computer arrangement. The invention outlined below relates to a computer program comprising program code means for performing all the steps of the method described above when said program is run on a computer. The invention further relates to a computer program product comprising program code means stored on a computer readable medium for performing all steps of the method described above when said program product is run on a computer. Finally, the invention relates to a computer system for implementing a method of cleaning a particulate filter in a vehicle comprising a memory for storing program code means and a processor operable to run said program code means for performing all the steps of the method described above.

FIG. 11 shows an apparatus 50 according to one embodiment of the invention, comprising a nonvolatile memory 52, a processor 51 and a read and write memory 56. The memory 52 has a first memory part 53, in which a computer program for controlling the apparatus 50 is stored. The computer program in the memory part 53 for controlling the apparatus 50 can be an operating system. The apparatus 50 can be enclosed in, for example, a control unit, such as the engine control unit 40 shown in FIG. 10a. The data-processing unit 51 can comprise, for example, a microcomputer.

The memory 52 also has a second memory part 54, in which a program for controlling the target gear selection function according to the invention is stored. In an alternative embodiment, the program for setting the predetermined condition and for controlling the function of the cleaning process operation is stored in a separate non-volatile storage medium 55 for data, such as, for example, a CD or an exchangeable semiconductor memory. The program can be stored in an executable form or in a compressed state.

When it is stated below that the data-processing unit 51 runs a specific function, it should be clear that the data-processing unit 51 is running a specific part of the program stored in the memory 54 or a specific part of the program stored in the non-volatile storage medium 55.

The data-processing unit 51 is tailored for communication with the storage memory 55 through a data bus 53. The data-processing unit 51 is also tailored for communication with the memory 52 through a data bus 57. In addition, the data-processing unit 51 is tailored for communication with the memory 56 through a data bus 58. The data-processing unit 51 is also tailored for communication with a data port 59 by the use of a data bus 60.

The method according to the present invention can be executed by the data-processing unit 51, by the data-processing unit 51 running the program stored in the memory 54 or the program stored in the non-volatile storage medium 55.

The invention is not limited to the above examples, but may be varied freely within the scope of the appended claims.

The invention claimed is:

1. A method for cleaning a particulate filter in a vehicle provided with an internal combustion engine, which particulate filter is mounted in an operative position inside an exhaust muffler under normal operation of the engine, comprising performing a cleaning process involving:
- disassembling and removing the particulate filter from a first end of the muffler;
- reversing and reassembling the particulate filter in a cleaning position, the cleaning position being different from the operative position, at the first end of the muffler;
- starting and operating the engine by controlling the engine speed according to a predefined cycle until a predetermined condition is fulfilled; and
- stopping the engine and returning the particulate filter to its operative position inside the exhaust muffler.

2. The method according to claim 1, comprising varying the engine speed between an upper and a lower limit for a set number times during at least one cycle and measuring a value representing the predetermined condition at the end of the at least one cycle.

3. The method according to claim 2, comprising increasing the engine speed to a stabilized value during a set time period at the end of the at least one cycle and measuring a value representing the predetermined condition.

4. The method according to claim 3, comprising stabilizing the engine speed to a value equal to or above the upper limit during a set time period at the end of the at least one cycle and measuring a value representing the predetermined condition.

5. The method according to claim 1, comprising repeating the cycle until the predetermined condition is fulfilled or until a maximum number of cycles have been performed.

6. The method according to claim 1, comprising measuring a value for the exhaust back pressure to determine if the predetermined condition is fulfilled.

7. The method according to claim 1, comprising measuring a value for the pressure drop across the particulate filter to determine if the predetermined condition is fulfilled.

8. The method according to claim 1, comprising controlling the engine speed during the cleaning process using an electronic engine control unit.

9. The method according to claim 1, comprising controlling the engine speed during the cleaning process using an external electronic control unit.

10. The method according to claim 8, comprising storing measurements of the value from a previous cleaning process in the electronic control unit to set the predetermined condition.

11. The method according to claim 8, comprising storing measurements of at least one value relating to the operation of the engine since the previous cleaning process in the electronic control unit to set the predetermined condition.

12. The method according to claim 1, comprising varying the engine speed between an upper and a lower limit manually and measuring the time from the start of the first cycle.

13. Arrangement comprising a vehicle muffler and a particulate filter mounted in an operative position inside the exhaust muffler under normal operation of an engine connected to the muffler, wherein the particulate filter has a first contact surface facing a first end of the muffler, which first contact surface is in sealing contact with a cooperating surface at a first end of the muffler when the particulate filter is in an operative position of the particulate filter, and
the particulate filter has a second contact surface, which second contact surface is in sealing contact with the cooperating surface at the first end of the muffler when the particulate filter is in a filter cleaning position that is different from the operative position, wherein the particulate filter is located inside the muffler in its operative position, and the particulate filter is reversed and located at least partially outside the first end of the muffler in the filter cleaning position.

14. The arrangement according to claim 13, wherein the first and second contact surfaces are arranged on opposite sides of a flange around the outer periphery at one end of the particulate filter.

15. The arrangement according to claim 13, wherein each of the first and second contact surfaces comprises an annular contact surface that is identical and mirrored relative to a plane through the flange at right angles to the central axis of the particulate filter.

16. The arrangement according to claim 13, wherein an ash collecting device is attached to the end of the particulate filter remote from the muffler, when the particulate filter is in a filter cleaning position.

17. The arrangement according to claim 13, wherein an ash collecting device is attached to the annular sealing surface of the particulate filter remote from the muffler, when the particulate filter is in a filter cleaning position.

18. The arrangement according to claim 13, wherein the muffler containing the particulate filter also contains at least one SCR-catalyst.

19. A non-transitory computer program product comprising program code for performing all the steps of claim 1 when the program is run on a computer.

20. A non-transitory computer program product comprising program code stored on a computer readable medium for performing all steps of claim 1 when the program product is run on a computer.

21. A computer system for implementing a method of cleaning a particulate filter in a vehicle comprising a memory for storing program code and a processor operable to run the program code for performing all the steps of claim 1.

* * * * *